US012577997B2

(12) United States Patent
Bosis et al.

(10) Patent No.: US 12,577,997 B2
(45) Date of Patent: Mar. 17, 2026

(54) CALIPER BODY FOR BRAKE CALIPER, BRAKE CALIPER, AND DISC BRAKE

(71) Applicant: BREMBO S.p.A., Curno (IT)

(72) Inventors: Alberto Bosis, Curno (IT); Mauro Botti, Curno (IT); Andrea Domenico Lorenzo Pirino, Curno (IT); Raffaele Milanese, Curno (IT)

(73) Assignee: Brembo S.p.A., Curno (IT)

( * ) Notice: Subject to any disclaimer, the term of this patent is extended or adjusted under 35 U.S.C. 154(b) by 412 days.

(21) Appl. No.: 18/192,673

(22) Filed: Mar. 30, 2023

(65) Prior Publication Data

US 2023/0313856 A1    Oct. 5, 2023

(30) Foreign Application Priority Data

Mar. 30, 2022    (IT) ......................... 102022000006218

(51) Int. Cl.
*F16D 65/847*        (2006.01)
*F16D 65/00*         (2006.01)
        (Continued)

(52) U.S. Cl.
CPC ....... *F16D 65/847* (2013.01); *F16D 65/0056* (2013.01); *F16D 65/0068* (2013.01);
        (Continued)

(58) Field of Classification Search
CPC ............. F16D 65/0056; F16D 65/0068; F16D 65/847; F16D 55/226; F16D 2055/0008;
        (Continued)

(56) References Cited

U.S. PATENT DOCUMENTS 6,446,766 B1 *  9/2002  Cornolti ................ F16D 65/847
                                            188/71.6
9,291,224 B2 *  3/2016  Crippa .................. F16D 55/228
                (Continued)

FOREIGN PATENT DOCUMENTS

EP          1462671 A1      9/2004
WO      2008075386 A1      6/2008
            (Continued)

OTHER PUBLICATIONS

Search Report for IT 102022000006218 dated Oct. 25, 2022, Munich, DE.

*Primary Examiner* — Christopher P Schwartz

(74) *Attorney, Agent, or Firm* — Marshall & Melhorn, LLC

(57)            ABSTRACT

A caliper body which has a wheel-side first portion, a vehicle-side second portion, at least one thrust device housing, and at least one bridge connecting the wheel-side first portion to the vehicle-side second portion is provided. The at least one bridge has at least one ventilation opening and at least one conveying channel fluidically connected to the outside of the caliper body through the at least one ventilation opening. The least one ventilation opening directly faces in an axial direction the inside of the caliper body with the outside of the caliper body to direct heat generated inside the caliper body in an outer axial direction towards the
                (Continued)

outside of the caliper body and conveyed outside by the at least one conveying channel through the at least one ventilation opening.

14 Claims, 8 Drawing Sheets

(51) Int. Cl.
     F16D 55/00        (2006.01)
     F16D 55/226       (2006.01)
     F16D 65/78        (2006.01)
(52) U.S. Cl.
     CPC .............. F16D 2055/0008 (2013.01); F16D 2055/0016 (2013.01); F16D 55/226 (2013.01); F16D 2065/788 (2013.01); F16D 2065/789 (2013.01)
(58) Field of Classification Search
     CPC ....... F16D 2055/0016; F16D 2065/788; F16D 2065/789
     USPC .......... 188/73.1, 73.39, 73.43, 73.46, 73.47; D12/180
     See application file for complete search history.

(56)                 References Cited

U.S. PATENT DOCUMENTS

| 9,512,890 | B2 * | 12/2016 | Nessi .................. F16D 65/0975 |
| D790,417 | S * | 6/2017 | Bertone ........................ D12/180 |
| D805,012 | S * | 12/2017 | Crippa .......................... D12/180 |
| D840,301 | S * | 2/2019 | Bonetti ......................... D12/180 |
| 10,738,850 | B2 * | 8/2020 | Crippa .................. F16D 55/228 |
| 10,738,851 | B2 * | 8/2020 | Smith ................ F16D 65/0068 |
| 11,209,055 | B2 * | 12/2021 | Arienti .................. F16D 65/183 |
| D991,856 | S * | 7/2023 | Dell'Acqua ................. D12/180 |
| 11,821,476 | B2 * | 11/2023 | Rossi .................. F16D 65/0075 |
| 11,904,822 | B2 * | 2/2024 | Crippa ............... F16D 65/0056 |
| 2008/0053759 | A1 * | 3/2008 | Tait ...................... F16D 65/853 188/71.6 |
| 2011/0048870 | A1 | 3/2011 | Petrini |
| 2018/0209495 | A1 | 7/2018 | Wilson et al. |
| 2023/0341015 | A1 * | 10/2023 | Teruzzi ................. F16D 55/228 |

FOREIGN PATENT DOCUMENTS

| WO | 2011121553 | A1 | 10/2011 |
| WO | 2015101866 | A1 | 7/2015 |
| WO | 2017077428 | A1 | 5/2017 |
| WO | 2018127751 | A1 | 7/2018 |

* cited by examiner

CALIPER BODY FOR BRAKE CALIPER, BRAKE CALIPER, AND DISC BRAKE

CROSS REFERENCE TO RELATED APPLICATION

This application claims priority to Italian Patent Application No. 102022000006218 filed on Mar. 30, 2022, the contents of which are incorporated by reference in their entirety.

FIELD OF THE INVENTION

The present invention relates to a caliper body for a brake caliper, a brake caliper comprising said caliper body and a braking system comprising said brake caliper.

In particular, the present invention relates to a caliper body for a floating-type brake caliper.

BACKGROUND ART

In a disc brake, the brake caliper is arranged straddling the outer peripheral margin of a brake disc and adapted to rotate about a rotation axis (A-A) defining an axial direction (X-X). The axial direction (X-X) defines a radial direction (R-R), substantially orthogonal to the axial direction (X-X) and intersected thereto, and a tangential and circumferential direction (C-C), orthogonal to the axial direction (X-X), to the radial direction (R-R) and intersected thereto.

The brake disc comprises a bell to be connected to the wheel rim of a vehicle, a first braking surface, adapted to face toward the vehicle itself and defining the vehicle-facing side of the disc brake, or simply vehicle side, and an opposite braking surface, adapted to face the wheel of the vehicle and defining the wheel-facing side of the disc brake, or simply wheel side.

The brake calipers of the floating type usually comprise a caliper body and bracket.

The bracket comprises fixing elements to be mounted on a fixed supporting structure of the vehicle, which remains stationary with respect to the vehicle wheel, such as a stub axle of a vehicle suspension, a vehicle wheel hub, or a fork.

In the particular case of brake calipers of the floating type, the brake caliper further comprises coupling elements between the caliper body and the bracket, adapted to allow and guide the relative sliding movement between the caliper body and the bracket parallel to the axial direction (X-X).

When the brake caliper is mounted on a brake disc, the caliper body comprises a portion arranged on the vehicle-facing side, or vehicle side, or backing side, of the disc brake, adapted to face an inner braking surface of the disc, and a portion arranged on the wheel-facing side, or wheel side, or reaction side, of the disc brake, adapted to face an outer braking surface of the disc. The wheel-side and vehicle-side portions are connected by structures, known as bridges, which protrude to straddle the brake disc.

Housings are obtained in the bracket to accommodate two pads to apply the braking action on the respective opposite braking surfaces of the brake disc.

The wheel-side and/or vehicle-side portions have one or a plurality of hydraulic cylinder-piston pairs, which, in the case of hydraulic supply, are connected to a brake fluid feeding conduit to be activated and apply a thrust action on the pads.

In the particular case of floating-type brake calipers, a first brake pad, or active brake pad, is thrust against the disc directly by thrusting means, or pistons, housed in the vehicle-side portion of the caliper body. A second brake pad, or reaction brake pad, opposed to the first brake pad, is thrust against the disc by the wheel-side portion of the caliper body during the sliding of the caliper body relative to the bracket following the reaction resulting from the interaction between the first pad and the disc.

This braking action on the vehicles applies considerable friction adapted to create the desired braking torque, friction which, however, generates heat, determining an increase of the temperature of the brake disc, the pads, and the caliper body, while the braking action biases the caliper body itself, thereby deforming it.

The concomitant increase in the temperature of the caliper body and its deformation may lead to performance deterioration in terms of the mechanical strength of the caliper body and the brake fluid or other components. In particular, the overheating of the brake fluid and its possible transition to a gaseous state is to be avoided, because it is compressible and thus unsuitable for transferring the braking activation command to the brake caliper.

Known solutions for cooling the caliper body, such as the one described in document WO2015101866 by the applicant, involve ventilation channels made inside the caliper body, in the example of prior art in the circumferential direction through the bridges, adapted to increase the surface area through which heat exchange between the caliper body and air can take place.

However, the construction of ventilation channels may require complex production techniques and be incompatible with production techniques.

Furthermore, making the channels inside the bridges of the caliper body may lead to a reduction in the performance of the caliper body in terms of mechanical resistance to deformation.

Furthermore, as mentioned above, without a proper evacuation of the heat generated inside the caliper by the friction of the pad against the brake disc, the resulting increase in temperature may still overheat the brake caliper components, and in particular, the pistons, and thus the brake fluid present in the feeding conduits and cylinder chambers, forming a dangerously compressible gaseous state therein, leading to a lengthening of pedal stroke, decreasing braking efficiency, delaying braking and even preventing proper braking of the vehicle in some cases.

This very dangerous phenomenon, known as Vapor Lock, is only partially solved by using brake fluids with high boiling points.

A first known solution to properly evacuate heat and reduce said phenomenon is to provide the caliper bodies with ventilation openings, adapted to evacuate the heat generated by the friction of the pads against the braking surfaces of the brake disc.

It is common practice to form such openings passing radially between the bridges connecting the wheel-side and vehicle-side portions of the caliper body, as described in document WO2011121553A1 by the applicant. Such openings may be further obtained in the axial direction in the wheel-side or vehicle-side portions, generally between the cylinders themselves, as described in documents US20110048870A1 and EP1462671A1 by Akebono Corporation.

However, the openings provided radially between the bridges of the caliper body or axially in the wheel-side or vehicle-side portions result in a conveying of evacuated heat in the radial or axial direction to the wheel rim, which would make it difficult to properly evacuate the accumulated heat and could itself overheat, deteriorating its structural characteristics.

Furthermore, caliper bodies which include ventilation openings are necessarily bulkier and cover a greater disc arc, increasing the final footprint of the braking system, which may be incompatible with the space available in the wheel arch of the vehicle.

Finally, openings made in this way result in a reduction of the resistant section, compromising the stiffness of the caliper body itself.

It is further known to associate the caliper body, in particular in high-performance braking systems for racing vehicles, with a forced cooling air feeding device, which conveys a flow of air near the pads and piston ends facing the pads.

Examples of known solutions are, for example, the caliper body described in WO2008075386A1, by the applicant, or the solution described in WO2017077428A1, by the applicant, in which by means of a forced air feeding conduit, provided in the vehicle-side portion and comprising an inlet oriented according to the direction of travel, a flow of air is collected from the outside and directed by suitable veins from the vehicle-side portion to the wheel-side portion of the caliper, in particular near the pads and between the thrust elements, then allowing the heat generated by the friction of the pads against the brake disc to be removed by an outflow of air in a radial direction toward the brake disc bell.

However, known solutions require complex design and are prevalently designed for fixed-type brake calipers.

Additionally, said conduits require suitable external components to constitute an intake of fresh air circulating away from the caliper and conveying it to the feeding conduits.

Furthermore, known solutions are adapted to feed fresh cooling air to the brake caliper components, but they do not solve the problem of the subsequent evacuation of the heat removed from the components.

Additionally, their effectiveness is proportional to the speed reached by the vehicle, which determines the amount of inlet air, and thus they are inefficient in situations where the braking system is highly stressed but the speeds are low, e.g., on long and winding downhill slopes.

Additionally, their effectiveness is proportional to the volume of air that they can convey into the caliper, bringing lower performance in daily-use vehicles, on which the speeds reached are lower.

Additionally, as mentioned, they do not solve the problem of the evacuation of hot air which, after reaching the hot components, must be evacuated from the caliper.

Additionally, where complex cooling air feeding conduits are to be avoided, to ensure efficient airflow within the caliper, known solutions can only be mounted in a specific position relative to the vehicle, i.e., so that the feeding inlet is oriented in the direction of travel, a position that may be incompatible with the available space in the wheel arch.

Therefore, the need remains to find solutions to eliminate or minimize overheating and in particular proper evacuation of heat generated inside the caliper.

SUMMARY

It is an object of the present invention to overcome the drawbacks of the prior art and to provide a caliper body of simple construction, installation, and maintenance, adapted to evacuate heat produced inside the brake caliper during the braking action by conveying it to the outside of the brake caliper so that it can be properly disposed of.

These and other objects are achieved by a caliper body, a brake caliper, and a disc brake as described and claimed herein.

By providing a caliper body according to the appended claims, the heat generated by the friction of the pads against the brake disc is collected and naturally conveyed to the vehicle side, where the air that normally circulates in the wheel arch allows it to be evacuated quickly and properly.

In a preferred embodiment, the suggested solution, by virtue of appropriately oriented ribs, allows the output heat to be directed in a specific direction away from the caliper body which, for example, minimizes the influence of the wheel rim.

Furthermore, by virtue of the provision of a caliper body according to the appended claims, it is possible to provide a caliper body which is compact and light-weight at the same time, so that it can be accommodated even in daily-use vehicles, but at the same time mechanically rigid, so that it can withstand stresses during braking.

BRIEF DESCRIPTION OF THE FIGURES

Further features and advantages of the caliper body, of the brake caliper, and of the disc brake will be apparent from the description provided below of preferred, mutually optionally combinable embodiments thereof, given for illustrative but not limiting purposes, with reference to the accompanying figures, in which.

DETAILED DESCRIPTION

Figures 1, 2:
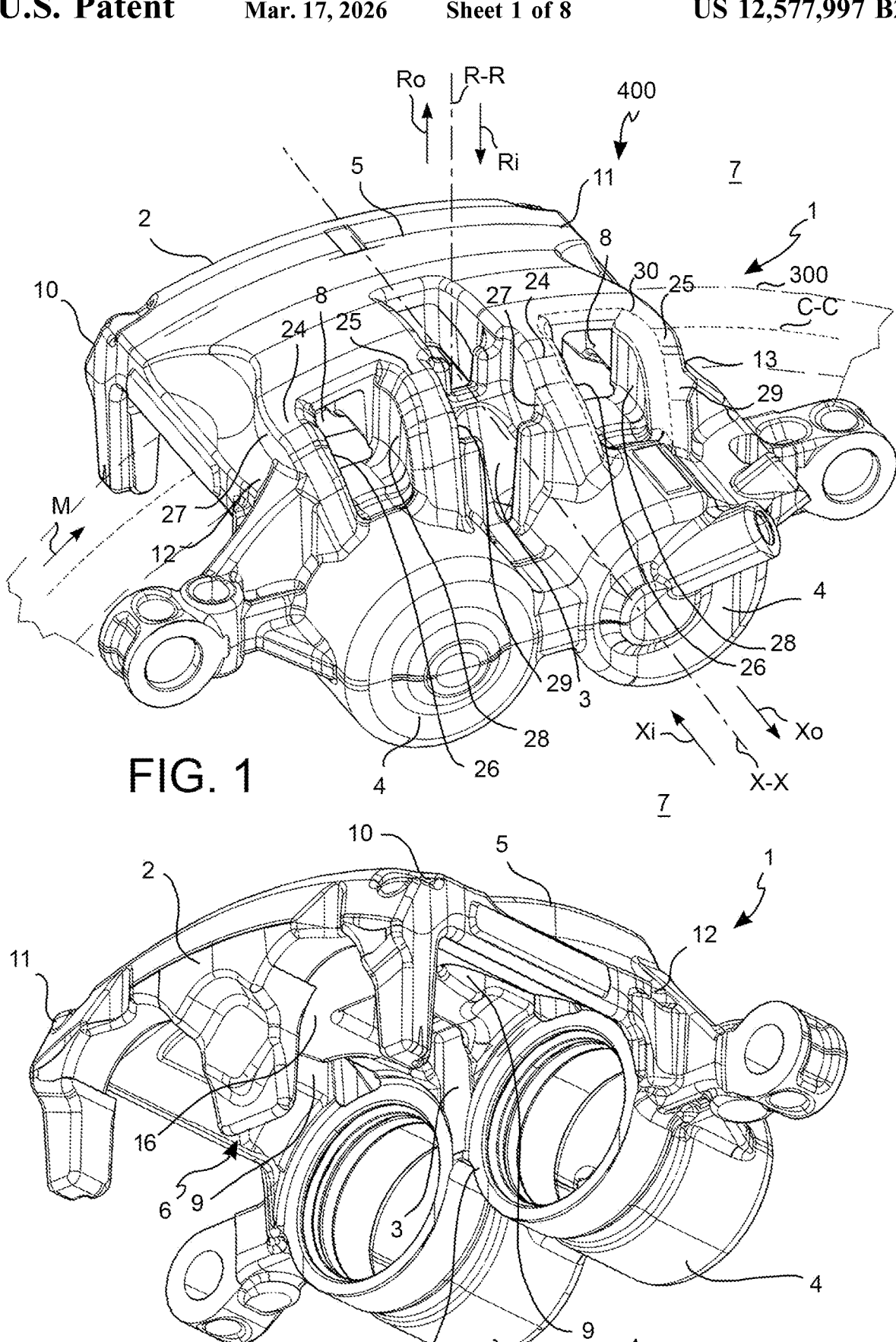
FIG. 1 is an axonometric view from above of a caliper body 1 for a brake caliper according to the present invention.
FIG. 2 shows an axonometric view from below of the caliper body 1 of FIG. 1.
Figure 3:
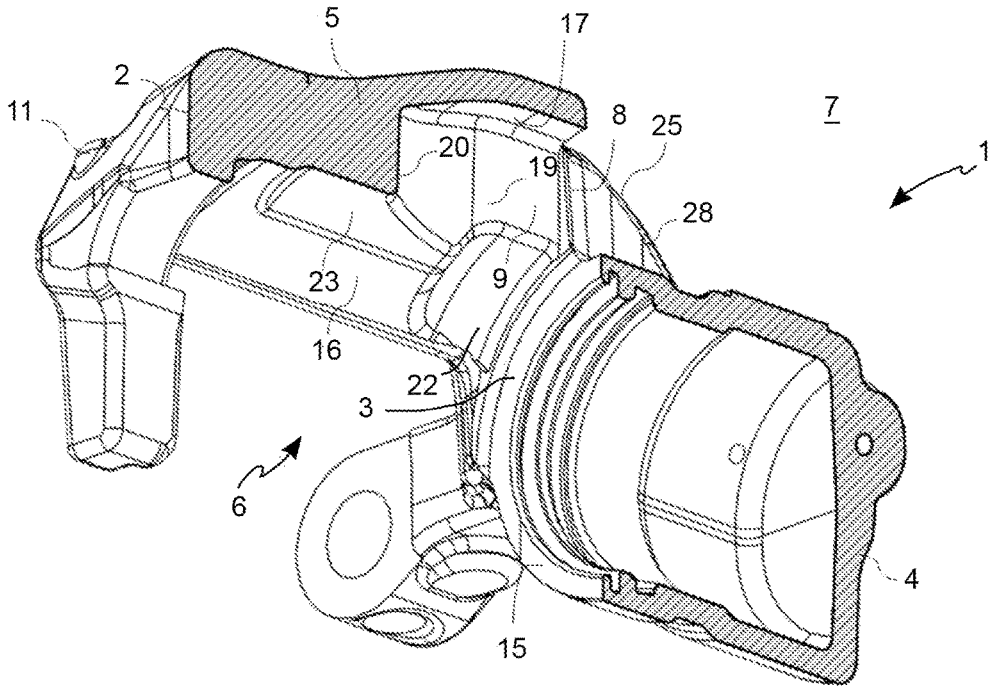
FIG. 3 shows an axonometric section view from below taken along a plane passing through the centerline of the thrust device of the brake caliper 1 of FIG. 1.
Figure 4:
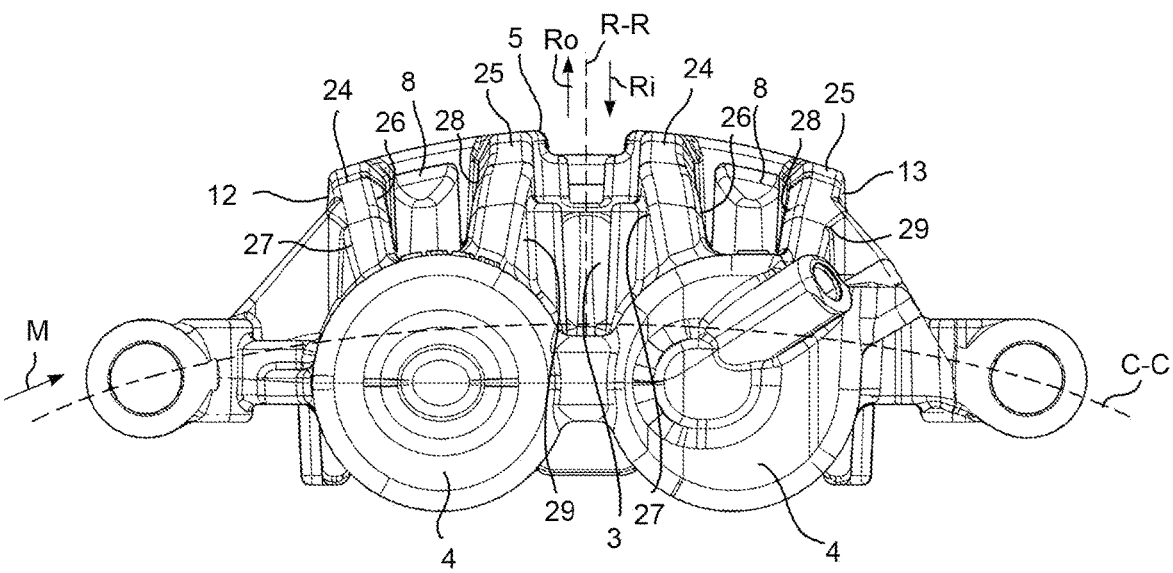
FIG. 4 is a front view of the caliper body 1 of FIG. 1.

According to an embodiment, a caliper body 1 for a brake caliper 200 is now described.

The caliper body 1 is adapted to be arranged straddling a brake disc 300.

The brake disc 300 comprises a brake disc first braking surface 301 and an opposite brake disc second braking surface 302.

The brake disc 300 is adapted to rotate relative to a rotation axis A-A.

In the figures, a direction of rotation M of the brake disc 300 in the forward motion of the vehicle is conventionally represented.

The rotation axis A-A defines an axial direction X-X parallel to the rotation axis A-A, a radial direction R-R orthogonal to the axial direction X-X, and a circumferential C-C or transversal orthogonal direction to both the axial direction X-X and the radial direction R-R.

The radial direction R-R defines a radially inward direction Ri, directed towards the rotation axis A-A of the brake disc 300, and a radially outward direction Ro, or radially outer direction Ro, opposite to the radially inward direction Ri.

The axial direction X-X defines an internal axial direction Xi, directed towards the brake disc 300, and an outer axial direction Xo, opposite with respect to the internal axial direction Xi.

The caliper body 1 comprises a wheel-side first portion 2 and a vehicle-side second portion 3.

The wheel-side first portion 2 is adapted to face, either directly or indirectly by means of a first pad 201, the brake disc first braking surface 301 to apply a braking action on the brake disc first braking surface 301.

The second vehicle-side portion 3 is adapted to face, either directly or indirectly by means of a second pad 202, the brake disc second braking surface 302 to apply a braking action on the brake disc second braking surface 302.

At least either the wheel-side first portion 2 or the vehicle-side second portion 3 comprises at least one thrust device housing 4 adapted to accommodate a thrust device.

The thrust device is adapted to bias the first pad 201 or the second pad 202 against the respective brake disc first braking surface 301 or the opposite brake disc second braking surface 302.

The caliper body 1 comprises at least one bridge 5 adapted to connect the wheel-side first portion 2 to the vehicle-side second portion 3, the at least one bridge being arranged straddling the brake disc 300.

The at least one bridge 5, the wheel-side first portion 2 and the vehicle-side second portion 3 define and separate a housing inside the caliper body 1, or simply inside the caliper body 6, from the space which remains outside the caliper body 1, or more simply outside the caliper body 7.

A portion of the brake disc 300, in particular an outer portion of a circular sector of the brake disc 300, and the first 201 and second 202 pads can be accommodated inside the caliper body 6.

The term "inside of the caliper body" means the space defined by the volume of the outer footprint of the caliper body 1 in the axial, radial, and circumferential dimensions from which the volume occupied by the material forming the caliper body 1 itself is subtracted. In other words, the inside of caliper body 6 is delimited by the inner surfaces of the caliper body 1 facing the brake disc 300 and/or the pads 201, 202, surfaces which define the housing in which the brake disc 300 and pads 201, 202 can be accommodated.

Similarly, the term "outside of the caliper body" means all the space outside the overall footprint of the caliper body 1.

Furthermore, according to the preceding definitions, the space inside the caliper body 6, the caliper body 1 itself, and the outside of the caliper body 7 form the totality of the space.

Furthermore, the at least one bridge 5 comprises at least one ventilation opening 8 adapted to put into communication the inside of the caliper body 6 with the outside of the caliper body 7.

According to an aspect of the present invention, the at least one ventilation opening 8 directly faces in the axial direction X-X the inside of the caliper body 6 with the outside of the caliper body 7.

The at least one bridge 5 further comprises at least one conveying channel 9 fluidically connected to the outside of the caliper body 7 through the at least one ventilation opening 8. For example, the term "channel" means a conduit having an entirely hollow body that for much of its longitudinal path, or totally, has an open cross-section.

The at least one conveying channel 9 extends longitudinally along a prevalently axial direction X-X.

Advantageously, the heat generated inside the caliper body 6 and conveyed by the at least one conveying channel 9 through the at least one ventilation opening 8 can be directed in the outer axial direction Xo towards the outside of the caliper body 7.

The heat inside the caliper body—generated by the friction of the pads 201, 202 against the respective facing brake disc braking surfaces 301, 302—is driven in the outer radial direction Ro by rotation of the brake disc 300 or, more accurately, by the air current directed in the outer radial direction generated by the centrifugal force due to the rotation of the brake disc 300 about the rotation axis A-A; this centrifugal hot air current will find on its path the at least one conveying channel 9 extended in the substantially axial direction X-X which will force the hot air current to exit axially Xo towards the outside of the caliper body 7 through the at least one ventilation opening 8.

The wheel-side first portion 2 comprises a first portion first end 10 and a circumferentially opposite first portion second end 11.

The vehicle-side second portion 3 comprises a second portion first end 12 and a circumferentially opposite second portion second end 13.

As can be seen from the figures, the first portion first end 10 is identifiable as the disc inlet end of the wheel-side first portion 2 of the caliper body 1, and the opposite first portion second end 11 is identifiable as the disc outlet end of the wheel-side first portion 2 of the caliper body 1.

Similarly, as can be seen from the figures, the first portion second end 12 is identifiable as the disc inlet end of the vehicle-side second portion 3 of the caliper body 1, and the opposite second portion second end 13 is identifiable as the disc outlet end of the vehicle-side second portion 3 of the caliper body 1.

Having defined a direction of rotation M of the brake disc 300 which corresponds to the nominal forward direction of the vehicle, the term "disc inlet" conventionally indicates the part of the brake caliper 200 which, being placed integrally with the rotating brake disc 300, is first met when entering the caliper itself.

Similarly, the term "disc outlet" conventionally refers to the part of the brake caliper 200 which, being placed integral with the rotating brake disc 300, is last met when exiting the brake caliper 200 itself.

According to an embodiment, the at least one bridge 5 is a single bridge adapted to connect the wheel-side first portion 2 to the vehicle-side second portion 3 and to be arranged straddling the brake disc 300.

According to the preceding embodiment, the single bridge 5 extends circumferentially seamlessly from the first portion first end 10 to the second portion second end 13 and respectively from the first portion second end 11 to the second portion second end 13.

The term "single bridge" means that only one bridge 5 is provided to connect between the wheel-side first portion 2 and the vehicle-side second portion 3.

The term "seamlessly" means that, taking any two points belonging to the single bridge 5 of the caliper body 1, the two points are connectable by a curved line, which remains entirely within the volume of the bridge 5 itself, without ever leaving and entering the wheel-side first portion 2 and/or the vehicle-side second portion 3.

Preferably, the geometry of the single bridge 5 is characterized, for example, by thickness reductions, non-planar geometries, smooth connections between the parts of the caliper body 1, or other expedients aimed at reducing the overall dimensions and weight of the single bridge 5.

According to an embodiment not necessarily combinable with the previously described embodiment or embodiments, the wheel-side first portion 2 comprises a first portion inner surface 14 adapted to face the first brake disc braking surface 301 and the opposite vehicle-side second portion 3 comprises a second portion inner surface 15 adapted to face the brake disc second braking surface 302.

Preferably, the at least one thrust device housing 4 is comprised in the vehicle-side second portion 3.

Preferably, the at least one ventilation opening 8 is formed near the second portion inner surface 15 radially above the at least one thrust device housing 4.

According to an embodiment not necessarily combinable with the previously described embodiment or embodiments, the at least one bridge 5 comprises an inner bridge surface 16 adapted to face the inside of the caliper body 6 and in particular toward the brake disc 300.

Preferably, the at least one conveying channel 9 is formed in the thickness of the bridge 5 starting from the inner bridge surface 16 in the outer radial direction Ro.

According to an embodiment not necessarily combinable with the previously described embodiment or embodiments, the at least one conveying channel 9 has a cross-section in the guise of a letter "U" and open toward the inside of the caliper body 6.

Preferably, the at least one conveying channel 9 is delimited by a channel bottom surface 17, a disc inlet channel flank 18, and a disc outlet channel flank 19.

Preferably, the channel bottom surface 17 is adapted to face towards the inside of the caliper body 6 to delimit the extension of the at least one conveying channel in the outer radial direction Ro.

Preferably, the disc inlet channel flank 18 faces the disc outlet channel flank 19 to delimit the extension of the at least one conveying channel 9 in the circumferential direction C-C.

According to an embodiment not necessarily combinable with the previously described embodiment or embodiments, the at least one conveying channel 9 comprises a channel end 20 axially opposite to the at least one ventilation opening 8.

Preferably, the disc inlet channel flank 18 and disc outlet channel flank 19 of the at least one conveying channel 9 converge until they join each other in the channel end 20 opposite to the at least one ventilation opening 8 of the caliper body 1.

According to an embodiment not necessarily combinable with the previously described embodiment or embodiments, the disc inlet channel flank 18 and disc outlet channel flank 19 broaden circumferentially in their portion closest to the at least one ventilation opening 8 into a disc inlet conveying side portion 21 and a disc outlet conveying side portion 22, respectively.

Preferably, the disc inlet conveying side portion 21 and disc outlet conveying side portion 22 have a smaller extension in the radial direction R-R than the at least one conveying channel 9.

Preferably, the disc inlet conveying side portion 21 and disc outlet conveying side portion 22 are oriented and formed in the radial direction R-R above the first pad 201 or second pad 202.

According to an embodiment not necessarily combinable with the previously described embodiment or embodiments, the at least one conveying channel 9 extends further in the internal axial direction Xi in an axial conveying portion 23.

Preferably, the axial conveying portion 23 has a smaller radial extension than the at least one conveying channel 9.

Preferably, the axial conveying portion 23 is oriented and formed in the radial direction R-R above the brake disc 300.

Preferably, the axial conveying portion 23 extends in the internal axial direction Xi from the channel end 20 toward the wheel-side first portion 2.

According to an embodiment not necessarily combinable with the previously described embodiment or embodiments, at least two ribs 24, 25 extend from the at least one bridge 5 in the outer axial direction Xo.

Preferably, the at least two ribs 24, 25 connect in their axially outermost portion with the at least one thrust device housing 4.

Preferably, the at least two ribs 24, 25 are made in one piece with the at least one bridge 5 and the at least one thrust device housing 4.

According to an embodiment not necessarily combinable with the previously described embodiment or embodiments, the at least two ribs 24, 25 comprise a first rib 24 and a second rib 25.

Preferably, the first rib 24 comprises a first rib inner shoulder 26 and an opposite first rib outer shoulder 27, which delimit the extension of the first rib 24 in the circumferential direction.

Preferably, the second rib 25 comprises a second rib inner shoulder 28 and an opposite second rib outer shoulder 29, which delimit the extension of the second rib 25 in circumferential direction.

Preferably, the first rib 24 and the second rib 25 extend from the at least one bridge 5 in the outer axial direction Xo near the at least one ventilation opening 8.

Therefore, it is apparent that if the caliper body 1 has a plurality of ventilation openings, for example, two ventilation openings 8 as shown in the figures, each ventilation opening 8 will be operationally associated with a first rib 24 and a second rib 25 as shown in the figures and according to any of the embodiments described herein.

Preferably, the first 24 and second ribs 25 are positioned to face the first rib inner shoulder 26 and the second rib inner shoulder 28 in the circumferential direction C-C.

Preferably, the first rib inner shoulder 26 and the second rib inner shoulder 28 connect near the at least one ventilation opening 8 respectively with the disc inlet channel flank 18 and with the disc outlet channel flank 19 of the at least one conveying channel 9 to create a nearly continuous surface therewith.

According to an embodiment not necessarily combinable with the previously described embodiment or embodiments, the first rib 24 and second rib 25 extend from the at least one bridge 5 converging with each other in their axially outermost portions.

Preferably, the first rib 24, the second rib 25, the at least one bridge 5 and the at least one thrust device housing 4 delimit an air outlet 30 which directs the heat generated inside the caliper body 6 in an outer axial-radial direction Re.

Indeed, the centrifugal hot air current, pushed in the outer axial-radial direction by the rotation of the brake disc 300, by virtue of the presence of the at least one conveying channel made in the substantially axial direction is forced to change direction and exit axially towards the outside of the caliper body 7 by the at least one ventilation opening 8, and then be further directed in the outer axial-radial direction by the air outlet 30.

Figure 5:
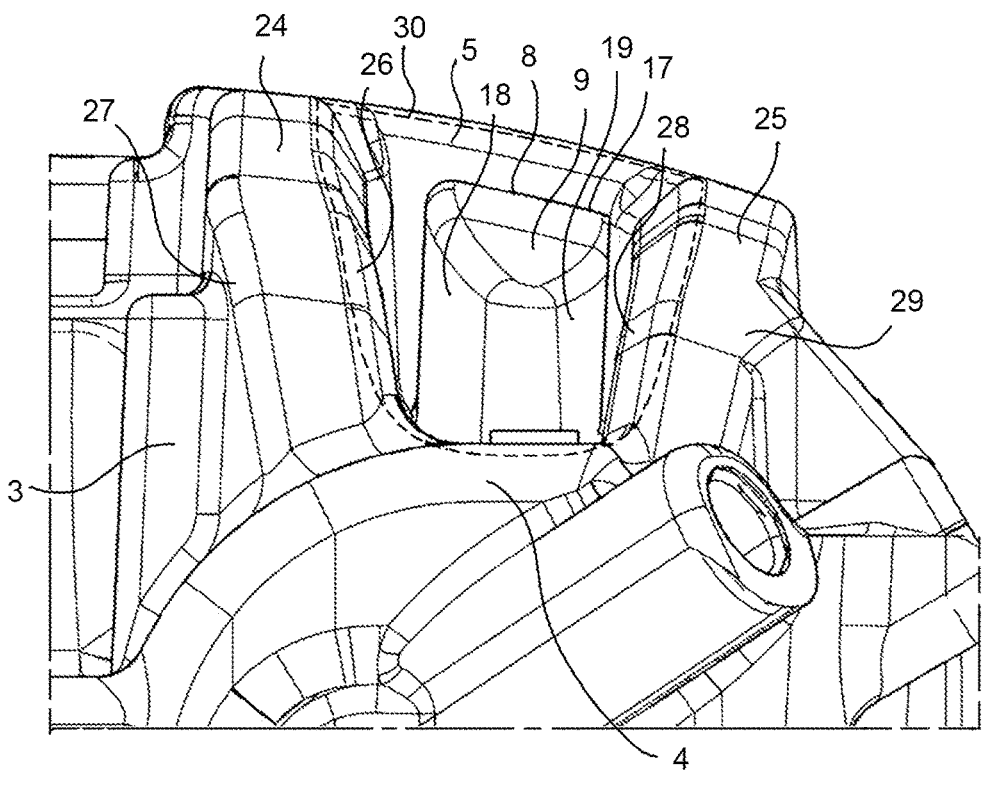
FIG. 5 shows an enlarged detail of the caliper body 1 of FIG. 4.
Figure 6:
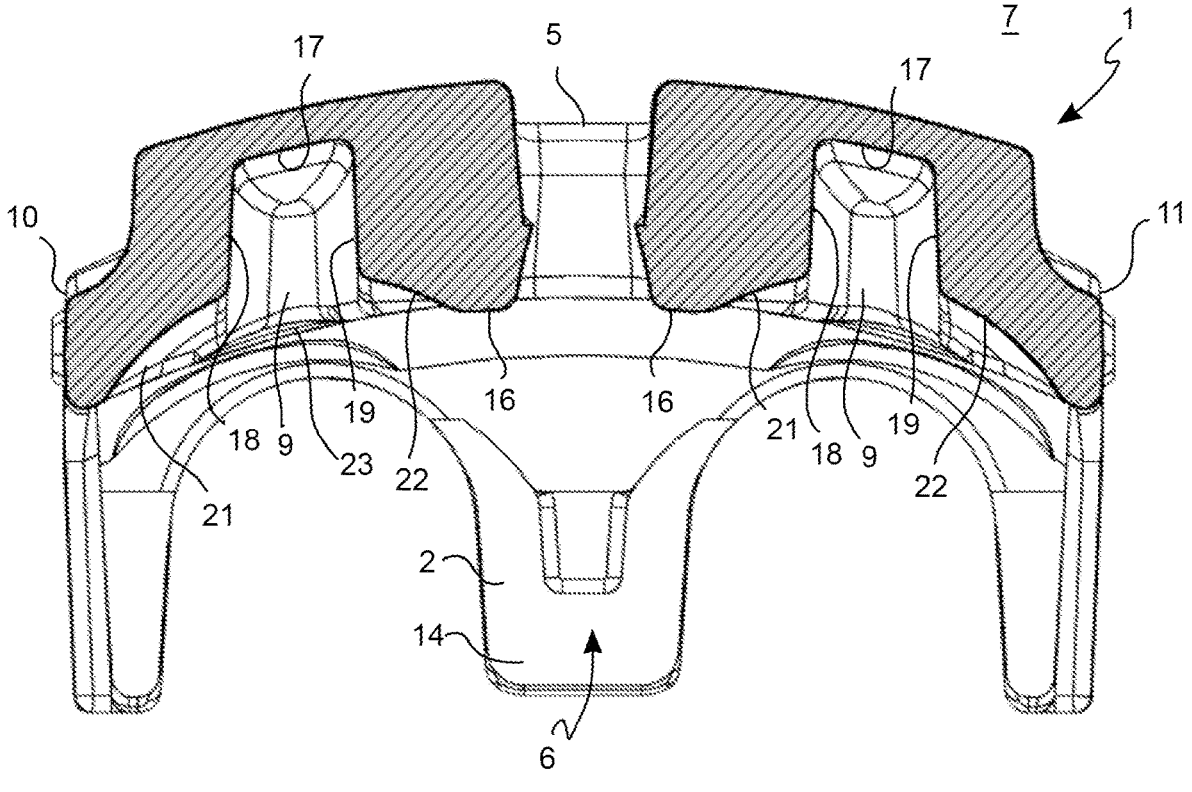
FIG. 6 shows a front section view taken along a plane passing through the centerline of the second pad of the caliper body 1 of FIG. 1.
Figure 7:
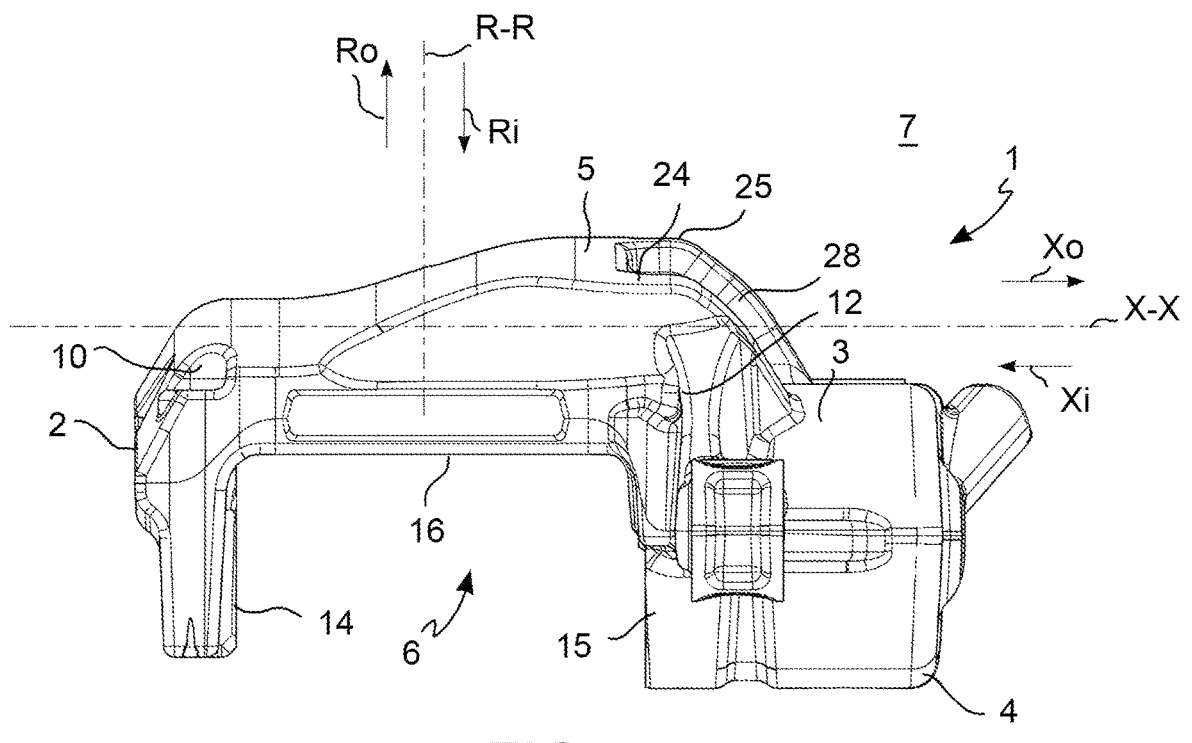
FIG. 7 shows a wheel-side disc-inlet-side lateral view of the caliper body 1 of FIG. 1.
Figure 8:
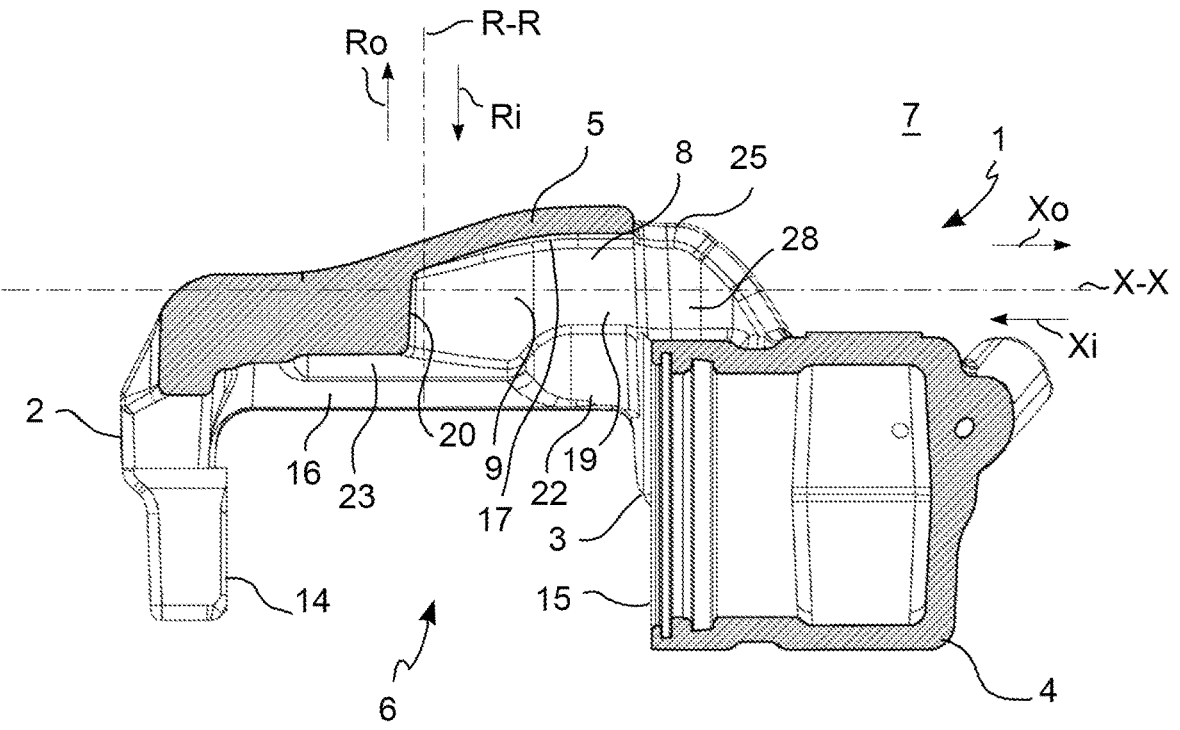
FIG. 8 shows a wheel-side disc-inlet-side lateral section view of the caliper body 1 of FIG. 1.
Figure 9:
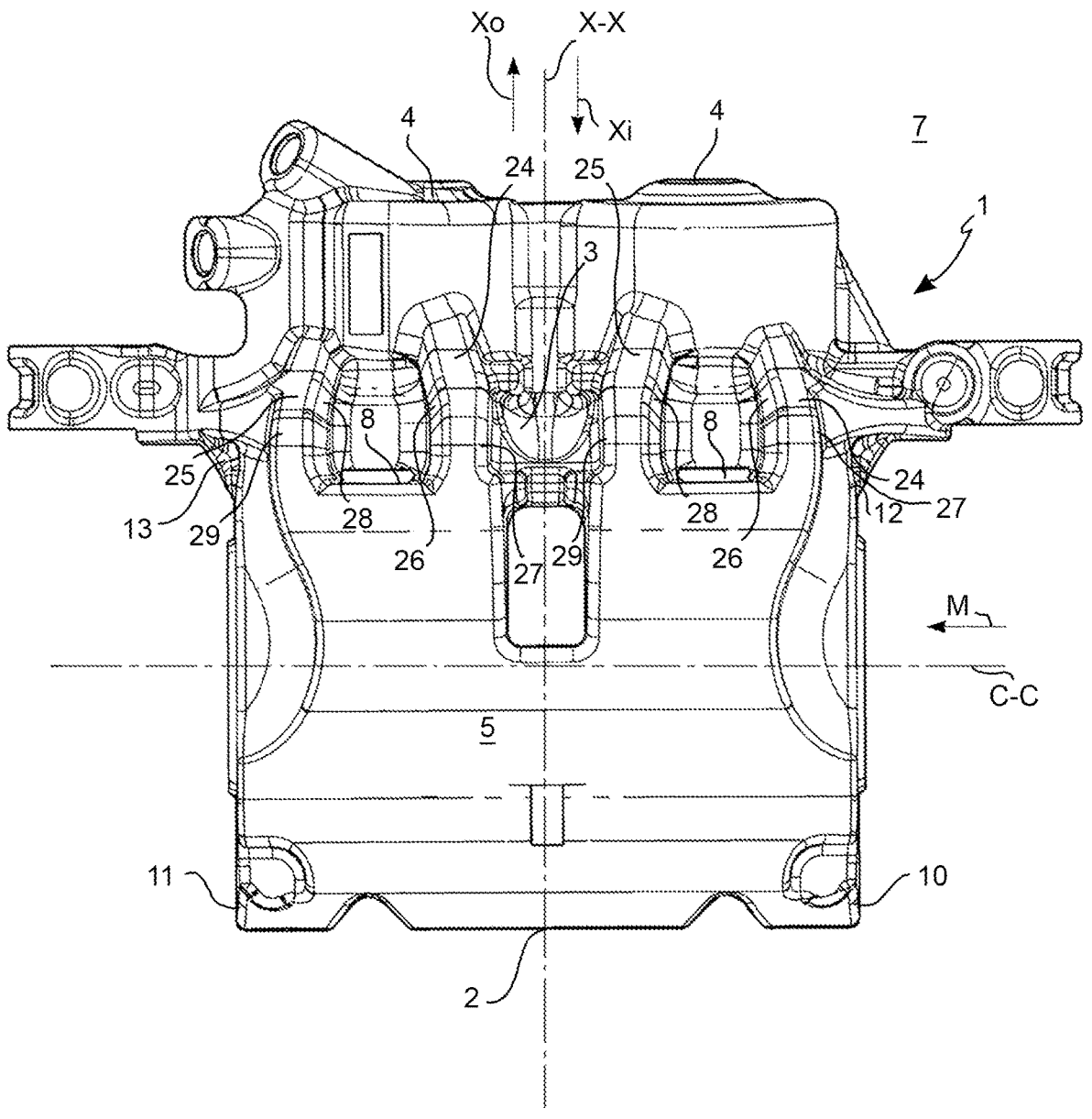
FIG. 9 is a view from above of the caliper body 1 of FIG. 1.
Figure 10:
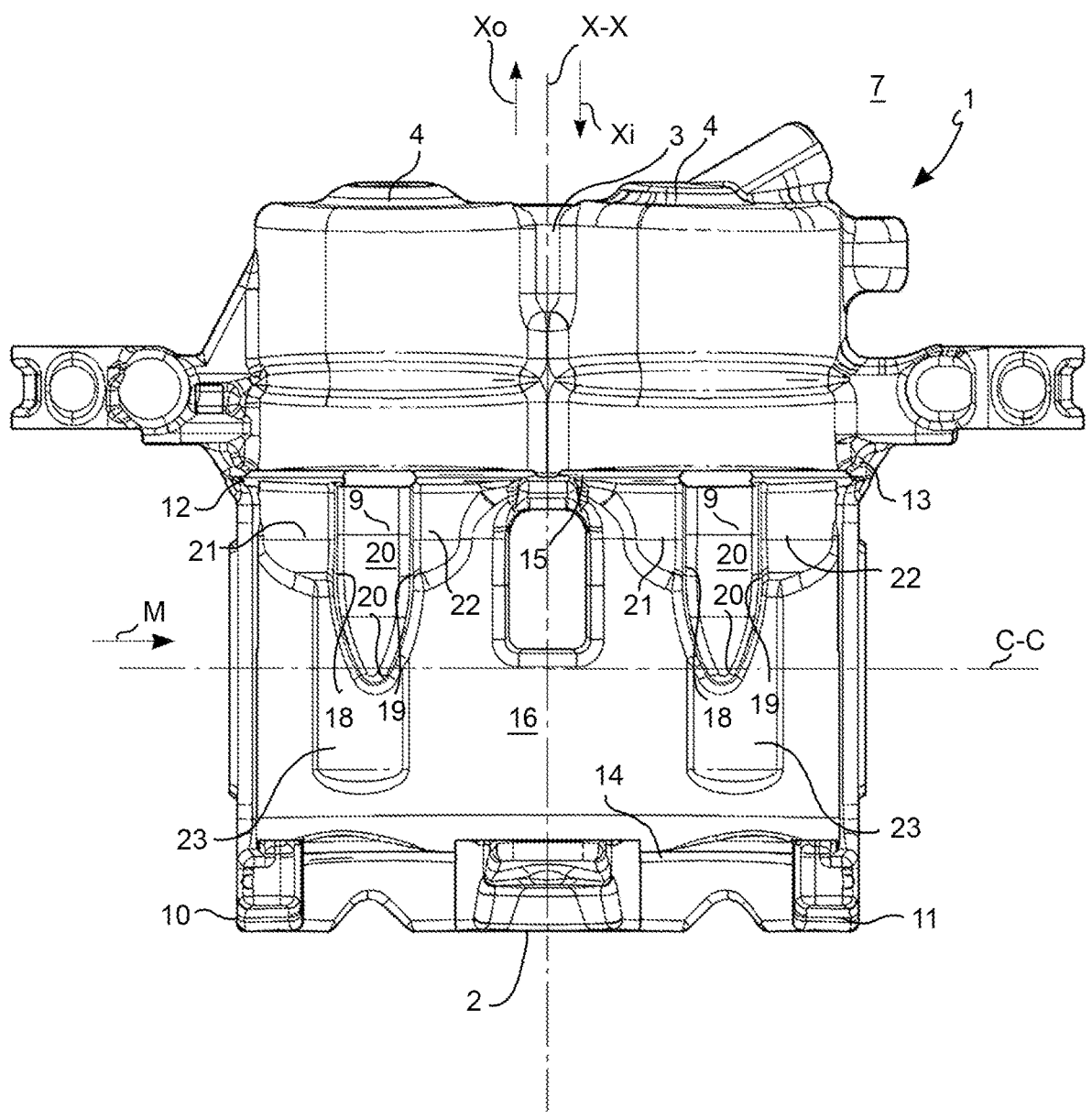
FIG. 10 is a view from below of the caliper body 1 of FIG. 1.
Figure 11:
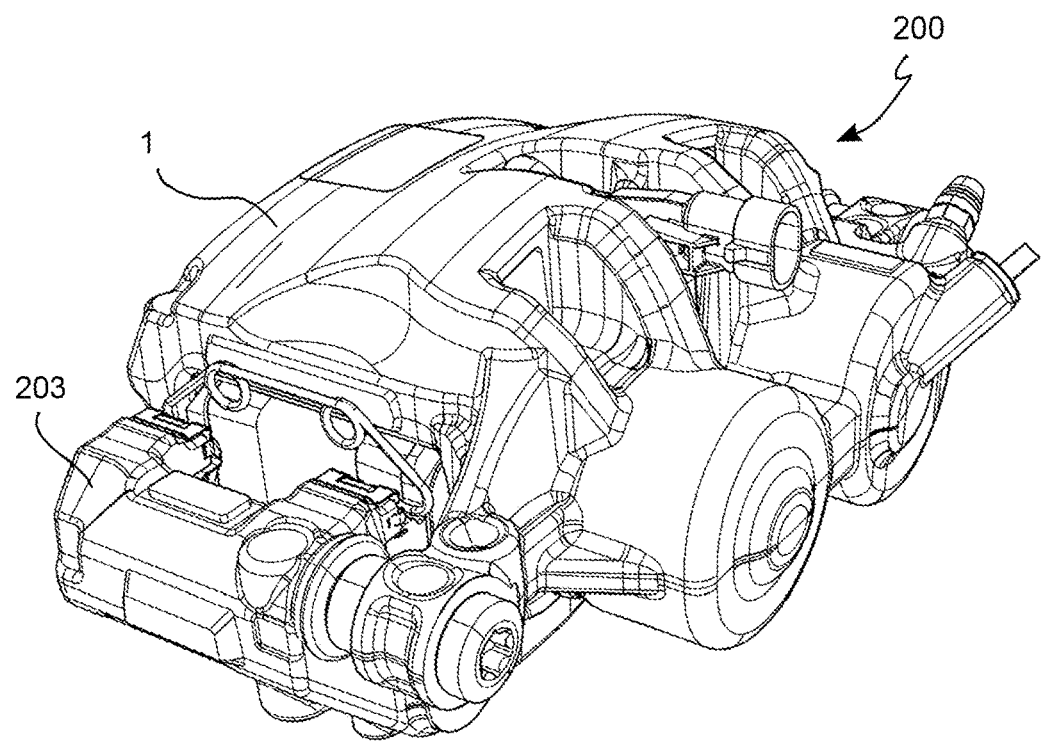
FIG. 11 is an axonometric view from above of the brake caliper 200 according to the present invention.
Figure 12:
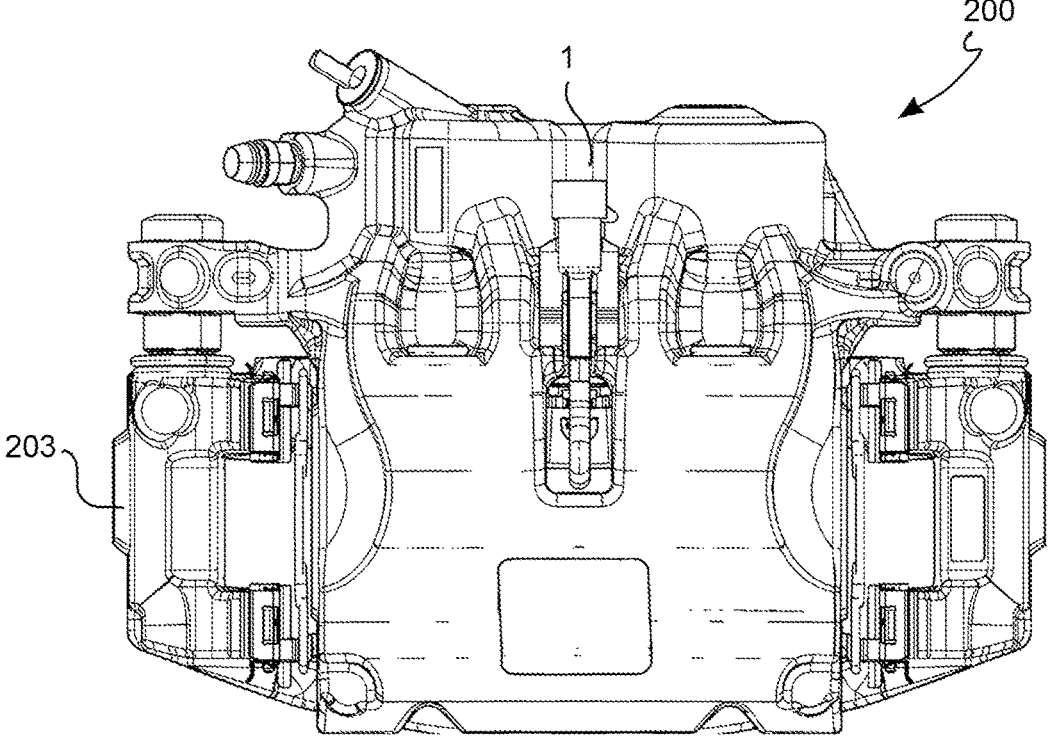
FIG. 12 is a view from below of the brake caliper 200 of FIG. 11.
Figure 13:
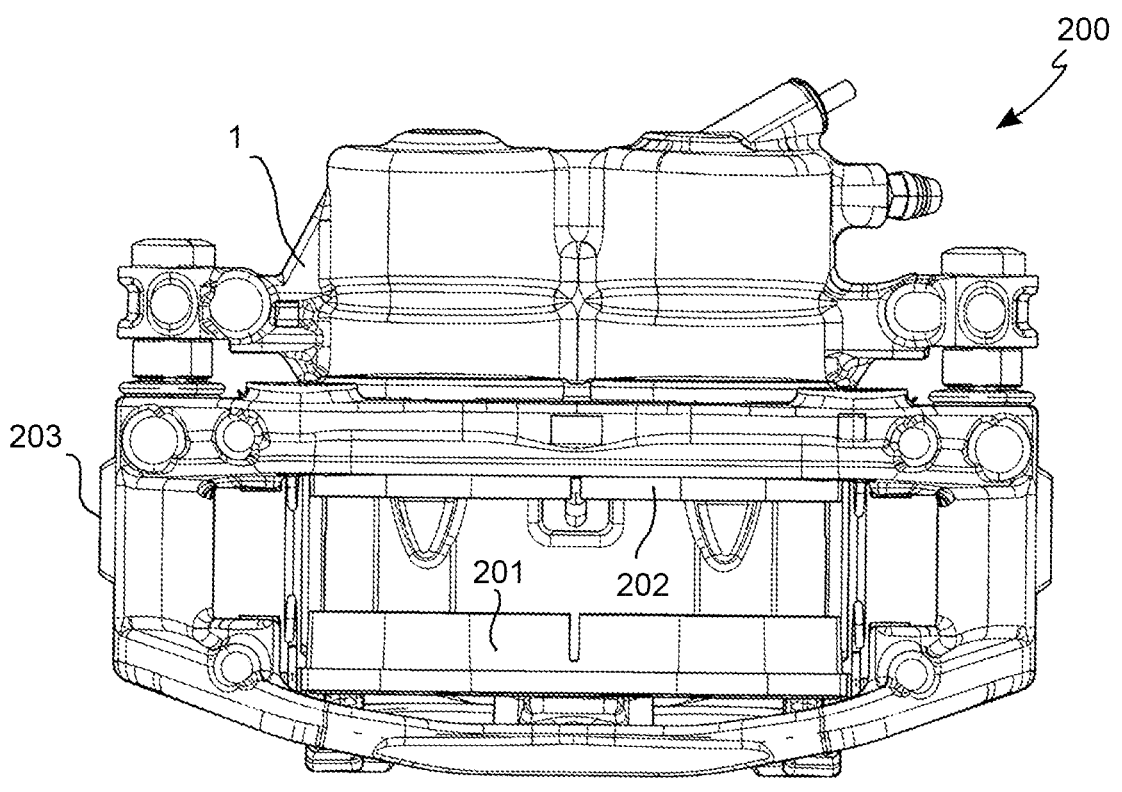
FIG. 13 is a view from below of the brake caliper 200 of FIG. 11.

The term "delimit an outlet" means that it is possible, for example as shown in FIG. 5 in detail, to draw a closed outlet profile 30 (dashed closed line) which touches the first and second ribs 24,25 the bridge 5, and the thrust device housing 4, and which delimits an outlet surface, not necessarily flat, directed substantially in the outer axial-radial direction so that a current of hot air passing through the air outlet is forcibly directed in the outer axial-radial direction.

The term "outer axial-radial direction" means a direction comprising a first component directed axially toward the outside and a second component directed radially toward the outside.

According to an embodiment not necessarily combinable with the previously described embodiment or embodiments, the caliper body 1 described in its preferred embodiments and aspects is a floating type caliper body 1 being suitable for sliding relatively to a bracket 203 along the axial direction X-X.

The present invention further relates to a brake caliper 200 comprising a caliper body 1, as defined in any one of the embodiments described before.

The present invention further relates to a disc brake 400 comprising a brake caliper 200 and a brake disc 300, the brake caliper 200 comprising a caliper body 1 as defined in any of the previously described embodiments.

The provision of a caliper body 1, a brake caliper 200 comprising said caliper body 1, and a disc brake 400 comprising said brake caliper 200 according to the present invention has numerous advantages.

Advantageously, the at least one properly oriented ventilation opening 8 allows the heat generated inside the caliper body 6 to be directed in a substantially axial direction toward the vehicle side, where the air that naturally circulates in the wheel arch during vehicle travel allows it to be naturally, quickly, and efficiently disposed of.

Furthermore, by virtue of the presence of at least one ventilation opening 8 thus oriented, it is no longer necessary to provide radial openings between the bridges of the caliper body, preventing in this manner the heat generated inside the caliper body from being pushed radially against the wheel rim and, thus, preventing overheating.

With an additional advantage, by virtue of the presence of at least one ventilation opening 8 so oriented, it is possible to provide a single bridge 5 which extends seamlessly as described from the wheel-side first portion 2 to the vehicle-side second portion 3, allowing for increased stiffness of the caliper body 1 itself, in particular in comparison with known brake calipers that provide radial openings between the bridges themselves.

At the same time, it is possible to provide a geometry of the single bridge 5 that allows the caliper body 1 to be lighter than brake calipers known in the prior art of equal footprint.

With an additional advantage, the presence of at least one conveying channel 9, fluidically connected with the outside of the caliper body 7 through the at least one ventilation opening 8, makes it possible to create a preferential fluid pathway for the heat pushed outward by the centrifugal action of the brake disc 300, so that it is quickly moved away from the inside of the caliper body 6 and thus in a manner that prevents the overheating of the components of the caliper body 1 itself.

With an added advantage, the at least one conveying channel 9 can be formed in the thickness of the bridge 5, so as to further lighten the bridge 5 and consequently the caliper body 1.

These advantages are further emphasized by providing the disc inlet 21 and disc outlet 22 side conveying portions and the axial conveying portion 23 according to the present disclosure.

With an additional advantage, by virtue of the design of the ribs 24, 25 according to the invention, the hot air exiting from the at least one ventilation opening 8 can be directed in a specific direction, and in particular in the outer axial-radial direction away from the caliper body 1 itself, so as to avoid its stagnation near the elements of the caliper body 1 and their consequent overheating.

With an added advantage, the ribs 24, 25 thus designed allow for increased resistance to deformation of the caliper body.

Advantageously, the caliper body 1, the brake caliper 200 comprising the caliper body, and the disc brake 400 comprising the brake caliper 200 according to the present invention have excellent mechanical deformation resistance properties and low weight at the same time.

In order to meet specific, contingent needs, those skilled in the art may make several changes and adaptations to the above-described embodiments and can replace elements with others which are functionally equivalent, without however departing from the scope of the following claims.

LIST OF REFERENCE SIGNS

A-A rotation axis
X-X axial direction
Xi inner axial direction
Xo outer axial direction
C-C circumferential direction
R-R radial direction
Ri inner radial direction
Ro outer radial direction
1. caliper body
2. wheel-side first portion
3. vehicle-side second portion
4. at least one thrust device housing
5. at least one bridge
6. inside of caliper body
7. outside of caliper body
8. at least one ventilation opening
9. at least one conveying channel
10. first portion first end
11. first portion second end
12. second portion first end
13. second portion second end
14. first portion inner surface
15. second portion inner surface
16. inner bridge surface
17. channel bottom surface
18. disc inlet channel flank
19. disc outlet channel flank
20. channel end
21. disc inlet conveying side portion
22. disc outlet conveying side portion
23. axial conveying portion 24. first rib 24
25. second rib 25
26. first rib inner shoulder
27. first rib outer shoulder
28. second rib inner shoulder
29. second rib outer shoulder
30. air outlet
200. brake caliper
201. first pad
202. second pad
203. bracket
300. brake disc
301. brake disc first braking surface
302. brake disc second braking surface
400. disc brake

What is claimed is:

1. A caliper body for a brake caliper, adapted to be arranged straddling a brake disc, said brake disc comprising a brake disc first braking surface and an opposite brake disc second braking surface, said brake disc having a defined rotation axis defining an axial direction parallel to said rotation axis, a radial direction orthogonal to said axial direction and a circumferential direction orthogonal to both the axial direction and the radial direction, said caliper body comprising:

a wheel-side first portion, adapted to face, either directly or indirectly through a first pad, said brake disc first braking surface to apply a braking action on said brake disc first braking surface;

a vehicle-side second portion, adapted to face, either directly or indirectly through a second pad, said brake disc second braking surface to apply a braking action on said brake disc second braking surface;

at least either said wheel-side first portion or said vehicle-side second portion comprising at least one thrust device housing adapted to accommodate a thrust device, adapted to bias said first pad or second pad respectively against the brake disc first braking surface or the brake disc second braking surface;

said caliper body further comprising at least one bridge connecting said wheel-side first portion to said vehicle-side second portion and arranged straddling the disc brake;

said at least one bridge, said wheel-side first portion and said vehicle-side second portion defining an inside of the caliper body, facing said brake disc either directly or indirectly, and a an outside of the caliper body opposite to the inside of the caliper body facing opposite or far from said brake disc; wherein said at least one bridge, said wheel-side first portion and said vehicle-side second portion separate the inside of the caliper body, in which a portion of said brake disc and said first and second pads are accommodable, from the outside of the caliper body;

said at least one bridge comprising at least one ventilation opening adapted to put into communication the inside of the caliper body with the outside of the caliper body;

said at least one bridge further comprising at least one conveying channel fluidically connected to the outside of the caliper body through said at least one ventilation opening;

said at least one conveying channel extending longitudinally along the axial direction;

wherein said at least one ventilation opening directly faces the inside of the caliper body in the axial direction to direct heat generated inside the caliper body in an outer axial direction towards the outside of the caliper body and conveyed outside by said at least one conveying channel through said at least one ventilation opening, said at least one conveying channel is delimited by a channel bottom surface, a disc inlet channel flank, and a disc outlet channel flank;

said channel bottom surface is adapted to face towards the inside of the caliper body to delimit an extension of said at least one conveying channel in an outer radial direction;

said disc inlet channel flank faces said disc outlet channel flank to delimit the extension of said at least one conveying channel in the circumferential direction; and said channel bottom surface, said disc inlet channel flank and disc outlet channel flank are adapted to define a cross-section shaped like a letter "U" and open towards the inside of the caliper body of the at least one conveying channel.

2. The caliper body of claim 1, wherein:

at least two ribs extend from said at least one bridge in the outer axial direction to connect in their outermost axial portion to said at least one thrust device housing;

said at least two ribs being made in one piece with said at least one bridge and said at least one thrust device housing.

3. The caliper body of claim 2, wherein:

said at least two ribs consist of a first rib and a second rib, respectively, said first rib comprises a first rib inner shoulder and an opposite first rib outer shoulder, which delimit an extension of said first rib in the circumferential direction;

said second rib comprises a second rib inner shoulder and an opposite second rib outer shoulder, which delimit an extension of said second rib in the circumferential direction;

said first and second ribs being positioned to face said first rib inner shoulder to said second rib inner shoulder in the circumferential direction;

said first rib inner shoulder and said second rib inner shoulder connecting near said at least one ventilation opening respectively to said disc inlet channel flank and said disc outlet channel flank of said at least one conveying channel to create a nearly continuous surface therewith.

4. The caliper body of claim 3, wherein:

said first and second ribs extend from said at least one bridge converging between each other; and said first and second ribs, said at least one bridge and said at least one thrust device housing delimit an air outlet adapted to direct the heat generated inside the caliper body into an outer axial-radial direction.

5. The caliper body of claim 1, wherein:

said wheel-side first portion comprises a first portion first end and a circumferentially opposite first portion second end;

said vehicle-side second portion comprises a second portion first end and a circumferentially opposite second portion second end;

said at least one bridge is a single bridge adapted to connect said wheel-side first portion to said vehicle-side second portion and to be arranged straddling the disc brake; and

said single bridge extends circumferentially seamlessly from said first portion first end to said first portion second end and respectively from said second portion first end to said second portion second end.

6. The caliper body of claim 5, wherein the geometry of said single bridge is characterized by thickness reductions, non-planar geometries, smooth connections between parts of said caliper body or other contrivances aimed at reducing overall dimensions and weight of said single bridge.

7. A brake caliper of a disc brake, comprising:

a caliper body as defined in claim 1; and a bracket.

8. A disc brake adapted to be mounted on a vehicle comprising a brake caliper according to claim 7.

9. The caliper body of claim 1, wherein:

said vehicle-side second portion comprises a second portion inner surface adapted to face said brake disc second braking surface;

said at least one thrust device housing is comprised in said vehicle-side second portion; and said at least one ventilation opening is formed near said second portion inner surface radially above the at least one thrust device housing.

10. The caliper body of claim 1, wherein:

said at least one bridge further comprises an inner bridge surface adapted to face the inside of the caliper body; and said at least one conveying channel is formed in a thickness of the least one bridge starting from said inner bridge surface in an outer radial direction.

11. The caliper body of claim 1, wherein:

said at least one conveying channel comprises a channel end axially opposite to said at least one ventilation opening; and said disc inlet channel flank and disc outlet channel flank of said at least one conveying channel converge until they join each other in the channel end.

12. The caliper body of claim 1, wherein:

said disc inlet channel flank and disc outlet channel flank broaden circumferentially in their portion closest to said at least one ventilation opening into a disc inlet conveying side portion and a disc outlet conveying side portion, respectively;

said disc inlet conveying side portion and disc outlet conveying side portion have a smaller extension in the radial direction than said at least one conveying channel; and said disc inlet conveying side portion and disc outlet conveying side portion are oriented and formed in the radial direction above said first pad or second pad.

13. The caliper body of claim 1, wherein:

said at least one conveying channel further extends in an internal axial direction in an axial conveying portion;

said axial conveying portion has a smaller extension in the radial direction than said at least one conveying channel; and said axial conveying portion is oriented and formed in the radial direction above said brake disc.

14. The caliper body of claim 1, wherein said caliper body is a floating type caliper body adapted to slide relatively to a bracket along the axial direction.

* * * * *